United States Patent
Lee et al.

(10) Patent No.: US 11,979,488 B2
(45) Date of Patent: May 7, 2024

(54) METHOD AND APPARATUS FOR GENERATING KEY STREAM

(71) Applicants: SAMSUNG SDS CO., LTD., Seoul (KR); Korea Advanced Institute of Science and Technology, Daejeon (KR)

(72) Inventors: Joo Hee Lee, Seoul (KR); Duk Jae Moon, Seoul (KR); Hyo Jin Yoon, Seoul (KR); Ji Hoon Cho, Seoul (KR); Seong Kwang Kim, Daejeon (KR); Joo Young Lee, Daejeon (KR); Jin Cheol Ha, Daejeon (KR)

(73) Assignees: Samsung SDS Co., Ltd., Seoul (KR); Korea Advanced Institute of Science and Technology, Daejeon (KR)

( * ) Notice: Subject to any disclaimer, the term of this patent is extended or adjusted under 35 U.S.C. 154(b) by 356 days.

(21) Appl. No.: 17/514,135

(22) Filed: Oct. 29, 2021

(65) Prior Publication Data
US 2022/0368518 A1 Nov. 17, 2022

(30) Foreign Application Priority Data
Apr. 23, 2021 (KR) .......................... 10-2021-0052987

(51) Int. Cl.
*H04L 9/08* (2006.01)
*G06F 7/50* (2006.01)
(Continued)

(52) U.S. Cl.
CPC .............. *H04L 9/0819* (2013.01); *G06F 7/50* (2013.01); *G06F 7/722* (2013.01); *G06F 17/16* (2013.01);
(Continued)

(58) Field of Classification Search
CPC . G06F 7/50; G06F 7/722; G06F 17/16; H04L 9/0631; H04L 9/0637;
(Continued)

(56) References Cited

U.S. PATENT DOCUMENTS 8,565,435 B2 * 10/2013 Gentry .................. H04L 9/0816
713/171
2006/0023875 A1 * 2/2006 Graunke ................. H04L 9/065
380/28

(Continued)

OTHER PUBLICATIONS

Wikipedia contributors. (Sep. 9, 2020). Benaloh cryptosystem. In Wikipedia, The Free Encyclopedia. Retrieved Dec. 14, 2023, from https://en.wikipedia.org/w/index.php?title=Benaloh_cryptosystem &oldid=977527848 (Year: 2020).*

(Continued)

*Primary Examiner* — Thomas J Dailey
(74) *Attorney, Agent, or Firm* — NSIP Law

(57) ABSTRACT

A method for generating a key stream according to an embodiment includes generating r round keys that are each N-dimensional integer vectors including elements of an integer set $\mathbb{Z}_t$ defined based on a prime number t, based on a random bit string, an encryption counter, and a secret key that is an N-dimensional integer vector consisting of elements of the integer set $\mathbb{Z}_t$, generating a first round output vector $x_1$ by performing a modular addition operation on an initial vector and a first round key $RK_1$ of the r round keys with the prime number t as a modulus, and generating a key stream that is an N-dimensional integer vector consisting of elements of the integer set $\mathbb{Z}_t$ from the first round output vector $x_1$ by using a second to r-th round keys of the r round keys, and one or more first round functions and a second round function.

28 Claims, 8 Drawing Sheets

(51) Int. Cl.
- G06F 7/72 (2006.01)
- G06F 17/16 (2006.01)
- H04L 9/06 (2006.01)
- H04L 9/14 (2006.01)

(52) U.S. Cl.
CPC .......... *H04L 9/0631* (2013.01); *H04L 9/0637* (2013.01); *H04L 9/0662* (2013.01); *H04L 9/0861* (2013.01); *H04L 9/14* (2013.01); *H04L 2209/24* (2013.01)

(58) Field of Classification Search
CPC ... H04L 9/0662; H04L 9/0819; H04L 9/0861; H04L 9/14; H04L 2209/24
See application file for complete search history.

(56) References Cited

U.S. PATENT DOCUMENTS

| | | | | |
|---|---|---|---|---|
| 2012/0307997 | A1* | 12/2012 | Endo | H04L 9/0631 380/28 |
| 2015/0023497 | A1* | 1/2015 | Millendorf | H04L 9/0637 380/44 |
| 2019/0229889 | A1* | 7/2019 | Kounavis | H04L 9/3026 |
| 2020/0044822 | A1* | 2/2020 | Kotha | H04L 9/0631 |
| 2020/0250318 | A1* | 8/2020 | Al Belooshi | H04L 9/0662 |
| 2021/0328765 | A1* | 10/2021 | Lee | H04L 9/008 |
| 2021/0391976 | A1* | 12/2021 | Sirdey | G06F 12/123 |

OTHER PUBLICATIONS

Wikipedia contributors. (Apr. 16, 2020). Paillier cryptosystem. In Wikipedia, The Free Encyclopedia. Dec. 14, 2023, from https://en.wikipedia.org/w/index.php?title=Paillier_cryptosystem&oldid=951355124 (Year: 2020).*

Wikipedia contributors. (Jan. 31, 2021). Damgård-Jurik cryptosystem. In Wikipedia, The Free Encyclopedia. Retrieved Dec. 14, 2023, from https://en.wikipedia.org/w/index.php?title=Damg%C3%A5rd%E2%80%93Jurik_cryptosystem&oldid=1004013163 (Year: 2021).*

Kristin Lauter et al., "Can Homomorphic Encryption be Practical?", ACM CCSW, pp. 113-124, 2011.

Jean-Claude Bajard et al., "A full RNS variant of FV like somewhat homomorphic encryption schemes.", International Conference on Selected Areas in Cryptography. Springer, Cham, 2016.

* cited by examiner

METHOD AND APPARATUS FOR GENERATING KEY STREAM

CROSS-REFERENCE TO RELATED APPLICATION(S)

This application claims the benefit under 35 USC § 119(a) of Korean Patent Application No. 10-2021-0052987, filed on Apr. 23, 2021, in the Korean Intellectual Property Office, the entire disclosure of which is incorporated herein by reference for all purposes.

BACKGROUND

1. Field

The following description relates to a technology for encryption.

2. Description of Related Art

Homomorphic encryption is an encryption system that enables the analysis of encrypted data without decryption. The biggest problem with current homomorphic encryption is that the size of the encrypted data is very large, and thus the network transmission cost and server storage cost are high. On the other hand, symmetric key encryption enables safe and efficient data transmission/storage since the sizes of the message and the ciphertext are the same, but it has the disadvantage that the encrypted data is not able to be analyzed without decryption.

Therefore, a ciphertext conversion framework capable of combining the advantages of homomorphic encryption and symmetric key encryption has been presented. In this framework, data encrypted using symmetric key encryption is transmitted and stored, and then the symmetric key ciphertext is converted into homomorphic ciphertext when analysis of the data is required. Until now, research to apply bit operation-based symmetric key encryption, such as the advanced encryption standard (AES) algorithm, to the ciphertext conversion as framework is being actively conducted. However, when the bit operation-based symmetric key encryption is combined with a homomorphic encryption that encrypts an integer message by applying the ciphertext conversion framework, there is a problem in that efficiency is reduced.

Therefore, when the ciphertext conversion framework is used in order to obtain an integer homomorphic ciphertext, a suitable modular operation-based symmetric key encryption method is required. However, the modular operation-based symmetric key encryption methods presented so far have a large multiplication depth, and as a consequence, a rebooting technique (bootstrapping) has to be applied when the above-mentioned methods are applied to the ciphertext conversion framework, which may lead to a limitation in actual application since the rebooting technique exhibits a very low efficiency.

SUMMARY

Disclosed embodiments are intended to provide a method and apparatus for generating a key stream for modular operation-based symmetric key encryption.

In one general aspect, there is a method for generating a key stream including generating r round keys (where r is a natural number of r≥3) that are each N-dimensional integer vectors (where $N=n^2$, n is an integer of 2 or more) consisting of elements of an integer set $\mathbb{Z}_t$ defined based on a prime number t, based on a random bit string, an encryption counter, and a secret key that is an N-dimensional integer vector consisting of elements of the integer set $\mathbb{Z}_t$; generating a first round output vector $x_1$ by performing a modular addition operation on an initial vector and a first round key $RK_1$ of the r round keys with the prime number t as a modulus; and generating a key stream that is an N-dimensional integer vector consisting of elements of the integer set $\mathbb{Z}_t$ from the first round output vector $x_1$ by using a second to r-th round keys of the r round keys, and one or more first round functions and a second round function.

The one or more first round functions may be sequentially performed and may generate each a j+1-th round output vector $x_{j+1}$ by using a j-th round output vector $x_j$ (where j is a natural number for $1 \le j \le r-1$) and a j+1-th round key $RK_{j+1}$ of the r round keys, and the second round function may generate the key stream by using an r−1-th round output vector $x_{r-1}$ generated by a first round function performed last among the one or more first round functions and an r-th round key $RK_r$ of the r round keys.

Each of the one or more first round functions may include a linear layer for generating a vector $y_j$ that is an N-dimensional integer vector consisting of elements of the integer set $\mathbb{Z}_t$ by performing a linear transform on the j-th round output vector $x_j$, a nonlinear layer for generating a vector $z_j$ that is an N-dimensional integer vector consisting of elements of the integer set $\mathbb{Z}_t$ by performing a nonlinear transform on the vector $y_j$, and an addition layer for generating the j+1-th round output vector $x_{j+1}$ by performing a modular addition operation on the vector $z_j$ and the j+1-th round key $RK_{j+1}$ with the prime number t as a modulus.

The linear layer may perform the linear transform by using a predefined first matrix of size n×n consisting of elements of the integer set $\mathbb{Z}_t$ and a second matrix that is a transposed matrix of the first matrix.

The linear layer may convert the j-th round output vector $x_j$ into a matrix $X_j$ of size n×n, generate a matrix $Y_j$ of size n×n by performing modular multiplication on the matrix $X_j$, the first matrix, and the second matrix with the prime number t as a modulus, and convert the matrix $Y_j$ into the vector $y_j$.

The linear layer may generate the matrix $Y_j$ using Equation 1 below, $$Y_j = A \cdot X_j \cdot B \pmod{t} \in \mathbb{Z}_t^{n \times n} \qquad \text{(Equation 1)}$$

where A is the first matrix and B is the second matrix.

The nonlinear layer may perform the nonlinear transform by using a nonlinear function having an m-th-order polynomial component (where m is a natural number for m≥2).

The second round function may include a first linear layer for generating a vector $y_{r-1}$ that is an N-dimensional integer vector consisting of elements of the integer set $\mathbb{Z}_t$ by performing a linear transform on the r−1-th round output vector $x_{r-1}$, a nonlinear layer for generating a vector $z_{r-1}$ that is an N-dimensional integer vector consisting of elements of the integer set $\mathbb{Z}_t$ by performing a nonlinear transform on the vector $y_{r-1}$, a second linear layer for generating a vector s that is an N-dimensional integer vector consisting of elements of the integer set $\mathbb{Z}_t$ by performing a linear transform on the vector $z_{r-1}$, and an addition layer for generating the key stream by performing a modular addition operation on the vector s and the r-th round key $RK_r$ with the prime number t as a modulus.

Each of the first linear layer and the second linear layer may perform the linear transform by using a predefined first matrix of size n×n consisting of elements of the integer set $\mathbb{Z}_t$ and a second matrix that is a transposed matrix of the first matrix.

The first linear layer may convert the r−1-th round output vector $x_{r−1}$ into a matrix $X_{r−1}$ of size n×n, generate a matrix $Y_{r−1}$ of size n×n by performing modular multiplication on the matrix $X_{r−1}$, the first matrix, and the second matrix with the prime number t as a modulus, and convert the matrix $Y_{r−1}$ into the vector $y_{r−1}$, and the second linear layer may convert the vector $z_{r−1}$ into a matrix $Z_{r−1}$ of size n×n, generate a matrix S of size n×n by performing modular multiplication on the matrix $Z_{r−1}$, the first matrix, and the second matrix with the prime number t as a modulus, and convert the matrix S into the vector s.

The first linear layer may generate the matrix $Y_{r−1}$ using Equation 2 below, $$Y_{r−1} = A \cdot X_{r−1} \cdot B (\bmod\ t) \in \mathbb{Z}_t^{n\times n} \quad \text{(Equation 2)}$$

where A is the first matrix and B is the second matrix, and the second linear layer may generate the matrix S using Equation 3 below, $$S = A \cdot Z_{r−1} \cdot B (\bmod\ t) \in \mathbb{Z}_t^{n\times n} \quad \text{(Equation 3)}$$

where A is the first matrix and B is the second matrix.

The generating of the round key may include generating a seed bit string based on the random bit string and the encryption counter, generating r vectors that are each N-dimensional integer vectors consisting of elements of the integer set $\mathbb{Z}_t$ from the seed bit string by using a predefined generation function, and generating the r round keys by performing modular multiplication operation on each of the r vectors and the secret key by with the prime number t as a modulus.

The generating of the r round keys may include generating the r round keys using Equation 4 below, $$RK_i = k \circ rc_i (\bmod\ t) \quad \text{(Equation 4)}$$

where $RK_i$ is an i-th round key of the r round keys, k is the secret key, $rc_i$ is an i-th vector of the r vectors, i is a natural number for $1 \leq i \leq r$, and ∘ is an elementwise product between the two vectors.

In another general aspect, there is an apparatus for generating a key stream, the apparatus including a memory that stores one or more instructions and one or more processors that execute the one or more instructions, in which the one or more processors are configured to generate r round keys (where r is a natural number of r≥3) that are each N-dimensional integer vectors (where N=n², n is an integer of 2 or more) consisting of elements of an integer set $\mathbb{Z}_t$ defined based on a prime number t, based on a random bit string, an encryption counter, and a secret key that is an N-dimensional integer vector consisting of elements of the integer set $\mathbb{Z}_t$, generate a first round output vector $x_1$ by performing a modular addition operation on an initial vector and a first round key $RK_1$ of the r round keys with the prime number t as a modulus, and generate a key stream that is an N-dimensional integer vector consisting of elements of the integer set $\mathbb{Z}_t$ from the first round output vector $x_1$ by using a second to r-th round keys of the r round keys, and one or more first round functions and a second round function.

The one or more first round functions may be sequentially performed and may generate each a j+1-th round output vector $x_{j+1}$ by using a j-th round output vector $x_j$ (where j is a natural number for $1 \leq j \leq r−1$) and a j+1-th round key $RK_{j+1}$ of the r round keys, and the second round function may generate the key stream by using an r−1-th round output vector $x_{r−1}$ generated by a first round function performed last among the one or more first round functions and an r-th round key $RK_r$ of the r round keys.

Each of the one or more first round functions may include a linear layer for generating a vector $y_j$ that is an N-dimensional integer vector consisting of elements of the integer set $\mathbb{Z}_t$ by performing a linear transform on the j-th round output vector $x_j$, a nonlinear layer for generating a vector $z_j$ that is an N-dimensional integer vector consisting of elements of the integer set $\mathbb{Z}_t$ by performing a nonlinear transform on the vector $y_j$, and an addition layer for generating the j+1-th round output vector $x_{j+1}$ by performing a modular addition operation on the vector $z_j$ and the j+1-th round key $RK_{j+1}$ with the prime number t as a modulus.

The linear layer may perform the linear transform by using a predefined first matrix of size n×n consisting of elements of the integer set $\mathbb{Z}_t$ and a second matrix that is a transposed matrix of the first matrix.

The linear layer may convert the j-th round output vector $x_j$ into a matrix $X_j$ of size n×n, generate a matrix $Y_j$ of size n×n by performing modular multiplication on the matrix $X_j$, the first matrix, and the second matrix with the prime number t as a modulus, and convert the matrix $Y_j$ into the vector $y_j$.

The linear layer may generate the matrix $Y_j$ using Equation 1 below, $$Y_j = A \cdot X_j \cdot B (\bmod\ t) \in \mathbb{Z}_t^{n\times n} \quad \text{(Equation 1)}$$

where A is the first matrix and B is the second matrix.

The nonlinear layer may perform the nonlinear transform by using a nonlinear function having an m-th-order polynomial component (where m is a natural number for m≥2).

The second round function may include a first linear layer for generating a vector $y_{r−1}$ that is an N-dimensional integer vector consisting of elements of the integer set $\mathbb{Z}_t$ by performing a linear transform on the r−1-th round output vector $x_{r−1}$, a nonlinear layer for generating a vector $z_{r−1}$ that is an N-dimensional integer vector consisting of elements of the integer set $\mathbb{Z}_t$ by performing a nonlinear transform on the vector $y_{r−1}$, a second linear layer for generating a vector s that is an N-dimensional integer vector consisting of elements of the integer set $\mathbb{Z}_t$ by performing a linear transform on the vector $z_{r−1}$, and an addition layer for generating the key stream by performing a modular addition operation on the vector s and the r-th round key $RK_r$ with the prime number t as a modulus.

Each of the first linear layer and the second linear layer may perform the linear transform by using a predefined first matrix of size n×n consisting of elements of the integer set $\mathbb{Z}_t$ and a second matrix that is a transposed matrix of the first matrix.

The first linear layer may convert the r−1-th round output vector $x_{r−1}$ into a matrix $X_{r−1}$ of size n×n, generate a matrix $Y_{r−1}$ of size n×n by performing modular multiplication on the matrix $X_{r−1}$, the first matrix, and the second matrix with the prime number t as a modulus, and convert the matrix $Y_{r−1}$ into the vector $y_{r−1}$, and the second linear layer may convert the vector $z_{r−1}$ into a matrix $Z_{r−1}$ of size n×n, generate a matrix S of size n×n by performing modular multiplication on the matrix $Z_{r−1}$, the first matrix, and the second matrix with the prime number t as a modulus, and convert the matrix S into the vector s.

The first linear layer may generate the matrix $Y_{r−1}$ using Equation 2 below, $$Y_{r−1} = A \cdot X_{r−1} \cdot B (\bmod\ t) \in \mathbb{Z}_t^{n\times n} \quad \text{(Equation 2)}$$

where A is the first matrix and B is the second matrix, and the second linear layer may generate the matrix S using Equation 3 below, $$S = A \cdot Z_{r-1} \cdot B (\bmod t) \in \mathbb{Z}_t^{n \times n} \quad \text{(Equation 3)}$$

where A is the first matrix and B is the second matrix.

The one or more processors may be further configured to generate a seed bit string based on the random bit string and the encryption counter, generate r vectors that are each N-dimensional integer vectors consisting of elements of the integer set $\mathbb{Z}_t$ from the seed bit string by using a predefined generation function, and generate the r round keys by performing modular multiplication operation on each of the r vectors and the secret key with the prime number t as a modulus.

The one or more processors may be further configured to generate the r round keys using Equation 4 below, $$RK_i = k \circ rc_i (\bmod t) \quad \text{(Equation 4)}$$

where $RK_i$ is an i-th round key of the r round keys, k is the secret key, $rc_i$ is an i-th vector of the r vectors, i is a natural number for $1 \leq i \leq r$, and $\circ$ is an elementwise product between the two vectors.

DETAILED DESCRIPTION

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice or the intention of a user or operator. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

Figure 1:
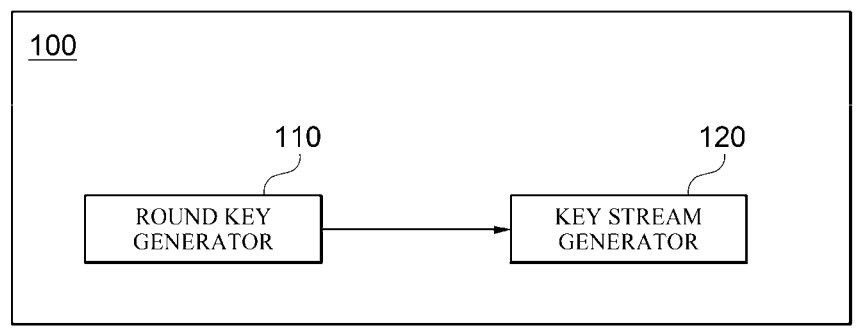
FIG. 1 is a block diagram of an apparatus for generating a key stream according to an embodiment.

FIG. 1 is a block diagram of an apparatus for generating a key stream according to an embodiment.

Referring to FIG. 1, an apparatus 100 for generating a key stream according to an embodiment includes a round key generator 110 and a key stream generator 120.

According to an embodiment, the apparatus 100 for generating a key stream (key stream generating apparatus) is an apparatus for generating a key stream to be used for symmetric key encryption based on a modular operation.

According to an embodiment, the round key generator 110 and the key stream generator 120 may be implemented using one or more physically separated devices, or may be implemented by one or more hardware processors or a combination of one or more hardware processors and software, and may not be clearly distinguished in specific operations, unlike the illustrated example.

The round key generator 110 generates r round keys (where r is a natural number for $r \geq 3$) based on a secret key, a random bit string, and an encryption counter. In this case, the secret key and the r round keys are each N-dimensional integer vectors (where $N = n^2$ and n is an integer of 2 or more) consisting of elements of an integer set $\mathbb{Z}_t$ defined based on a prime number t.

Specifically, the integer set $\mathbb{Z}_t$ may be defined as in Equation 1 below $$\mathbb{Z}_t = \{0, 1, 2, \ldots, t-1\}. \quad \text{(Equation 1)}$$

In addition, the secret key and the r round keys may be each N-dimensional vectors satisfying Equation 2 below $$k \in \mathbb{Z}_t^N, RK_i \in \mathbb{Z}_t^N. \quad \text{(Equation 2)}$$

In Equation 2, $\mathbb{Z}_t^N$ represents an N-dimensional vector space defined by elements of the integer set $\mathbb{Z}_t$, k represents the secret key, and $RK_i$ represents the i-th round key (where i is a natural number satisfying $1 \leq i \leq r$) of the r round keys, and they will be used to indicate the same meanings hereinafter.

Meanwhile, the prime number t and the number r of round keys to be generated may be set in advance as public parameters for encryption and decryption.

The random bit string means a randomly generated bit string, and the length of the random bit string may be determined based on the security strength required for encryption and decryption.

The encryption counter is a public parameter indicating the number of times encryption has been performed. According to an embodiment, the encryption counter may be a bit string of a preset length that is increased by a preset size whenever a key stream is generated using a secret key k.

According to an embodiment, the round key generator 110 may generate a seed bit string for generating round keys based on the random bit string and the encryption counter. For example, the round key generator 110 may generate a seed bit string by concatenating a random bit string and an encryption counter as shown in Equation 3 below $$seed = nc \| ctr \in \{0,1\}^*. \quad \text{(Equation 3)}$$

In Equation 3, seed represents a seed bit string, nc represents a random bit string, and ctr represents an encryption counter, and they will be used to indicate the same meanings hereinafter.

Meanwhile, according to an embodiment, the round key generator 110 may generate r N-dimensional vectors from the seed bit string using a predefined generation function. In this case, each of the generated r vectors may satisfy Equation 4 below $$rc_i \in \mathbb{Z}_t^N. \tag{Equation 4}$$

In Equation 4, $rc_i$ represents an i-th vector of r N-dimensional vectors generated by the generation function, and it will be used to indicate the same meanings hereinafter.

Meanwhile, the generation function may be, for example, an extensible output function (XOF) such as a SHA3-based SHAKE-256 function. However, the generation function is not necessarily limited to the above-described example, and according to embodiments, in addition to the above-described hash function, various functions that may have one-way and generate an arbitrary sequence based on an input bit string may be used as the generation function.

Meanwhile, according to an embodiment, after generating $rc_i$, the round key generator 110 may generate the i-th round key of r round keys based on the secret key k and $rc_i$. Specifically, the round key generator 110 may generate the i-th round key of the r round keys, for example, by performing a modular multiplication operation on the secret keys k and $rc_i$ with t as a modulus, as shown in Equation 5 below.

$$RK_i = k \circ rc_i (\bmod t). \tag{Equation 5}$$

In Equation 5, the operator "∘" represents an elementwise product (also referred to as a Hadamard product) between two vectors.

The key stream generator 120 generates a key stream that is an N-dimensional integer vector consisting of elements of the integer set $\mathbb{Z}_t$ by using a plurality of round functions performed based on the r round keys generated by the round key generator 110.

Figure 2:
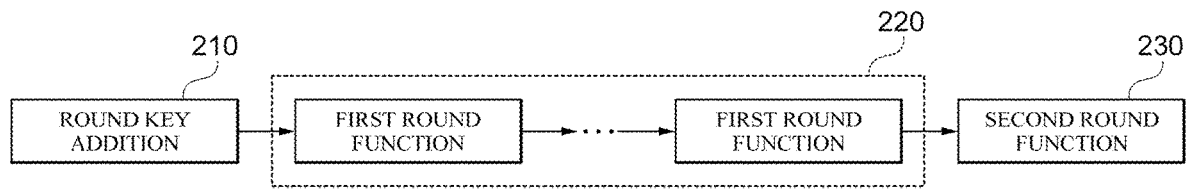
FIG. 2 is a block diagram for illustrating a process of generating a key stream performed by a key stream generator according to an embodiment.

Specifically, FIG. 2 is a block diagram for illustrating a process of generating a key stream performed by the key stream generator 120 according to an embodiment.

Referring to FIG. 2, the key stream generator 120 may generate a key stream by using round key addition 210, one or more first round functions 220 and a second round function 230.

The round key addition 210 refers to an operation of generating a first round output vector by performing a modular addition operation on the initial vector and the first round key of the r round keys with the prime number t as a modulus.

Specifically, the key stream generator 120 may perform the round key addition 210 using, for example, Equation 6 below $$x_1 = x_0 + RK_1 (\bmod t) \in \mathbb{Z}_t^N. \tag{Equation 6}$$

In Equation 6, $x_1$ represents a first round output vector, $x_0$ represents a preset initial vector, and $RK_1$ represents the first round key, respectively.

The one or more first round functions 220 may be sequentially performed, and the j-th first round function of the one or more first round functions 220 (where j is a natural number satisfying $1 \leq j \leq r-2$) may generate a j+1-th round output vector $x_{j+1}$ by using the j-th round output vector $x_j$ and a j+1-th round key $RK_{j+1}$ of the r round keys.

Meanwhile, the number of the first round functions 220 is not necessarily limited to a specific number, and may be changed according to the required encryption strength.

Figure 3:
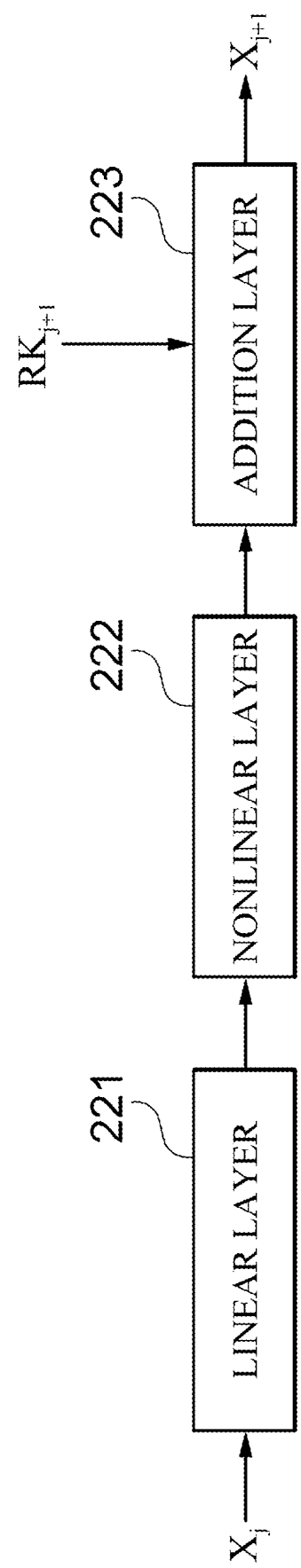
FIG. 3 is a diagram for illustrating a configuration of a first round function according to an embodiment.

FIG. 3 is a diagram for illustrating a configuration of the first round function 220 according to an embodiment.

Referring to FIG. 3, the one or more first round functions 220 according to an embodiment may each include a linear layer 221, a nonlinear layer 222, and an addition layer 223.

The linear layer 221 may perform a linear transform on the j-th round output vector $x_j$.

Specifically, when the linear layer 221 is a linear layer included in a first round function performed first (that is, j=1) among the one or more first round functions 220, the j-th round output vector $x_j$ input to the linear layer 221 may be the first round output vector generated through the round key addition 210 illustrated in FIG. 2 (that is, $x_j = x_1$).

On the other hand, when the linear layer 221 is a linear layer included in a first round function performed second or subsequently (that is, $1 < j \leq r-2$) among the one or more first round functions 220, the j-th round output vector $x_j$ input to the layer 221 may be a round output vector generated by the first round function performed immediately before (that is, j−1-th) among the one or more first round functions 220.

Meanwhile, according to an embodiment, the linear layer 221 may perform the linear transform by using a predefined first matrix of size n×n consisting of elements of the integer set $\mathbb{Z}_t$ and a second matrix that is a transposed matrix of the first matrix.

Specifically, the linear layer 221 may convert the j-th round output vector $x_j$ into a matrix $X_j$ of size n×n. For example, when the j-th round output vector $x_j$ is a 16-dimensional (that is, N=16) vector as shown in Equation 7 below, the linear layer 221 may convert the j-th round output vector $x_j$ into a matrix $X_j$ of size 4×4, as shown in Equation 8 below, $$x_j = \{x_{j,1}, \ldots, x_{j,16}\} \in \mathbb{Z}_t^{16} \tag{Equation 7}$$

and $$X_j = \begin{bmatrix} x_{j,1} & \cdots & x_{j,4} \\ \vdots & \ddots & \vdots \\ x_{j,13} & \cdots & x_{j,16} \end{bmatrix} \in \mathbb{Z}_t^{4 \times 4}. \tag{Equation 8}$$

Then, the linear layer 221 may generate a matrix $Y_j$ of size n×n by performing modular multiplication on the converted matrix $X_j$, the first matrix, and the second matrix with the prime number t as a modulus, and then convert the matrix $Y_j$ back into an N-dimensional vector $y_j$ and output the vector $y_j$.

Specifically, the matrix $Y_j$ may be generated using, for example, Equation 9 below $$Y_j = A \cdot X_j \cdot B (\bmod t) \in \mathbb{Z}_t^{n \times n} \tag{Equation 9}$$

where the operator [·] represents matrix multiplication, A represents the first matrix, and B represents the second matrix. In this case, the first matrix A and the second matrix B may satisfy Equations 10 and 11 below, $$A, B \in \mathbb{Z}_t^{n \times n} \tag{Equation 10}$$

and $$B = A^T. \tag{Equation 11}$$

Meanwhile, in an embodiment, when N=16, the matrix A may be predefined as, for example, Equation 12 below.

$$A = \begin{bmatrix} 2 & 3 & 1 & 1 \\ 1 & 2 & 3 & 1 \\ 1 & 1 & 2 & 3 \\ 3 & 1 & 1 & 2 \end{bmatrix} \quad \text{(Equation 12)}$$

However, the matrix A is not necessarily limited to Equation 12 and may be variously changed depending on embodiments.

Meanwhile, after generating the matrix $Y_j$, the linear layer 221 may convert the matrix $Y_j$ into the N-dimensional vector $y_j$ consisting of elements of the integer set $\mathbb{Z}_t$ and output the vector $y_j$ (that is, $y_j \in \mathbb{Z}_t^N$).

For example, when N=16 and the matrix $Y_j$ is a matrix of size 4×4 as shown in Equation 13, the matrix $Y_j$ may be converted into the 16-dimensional vector $y_j$ as shown in Equation 14, $$Y_j = \begin{bmatrix} y_{j,1} & \cdots & y_{j,4} \\ \vdots & \ddots & \vdots \\ y_{j,13} & \cdots & y_{j,16} \end{bmatrix} \in \mathbb{Z}_t^{4 \times 4} \quad \text{(Equation 13)}$$

and $$y_j = \{y_{j,1}, \ldots, y_{j,16}\} \in \mathbb{Z}_t^{16}. \quad \text{(Equation 14)}$$

Meanwhile, the nonlinear layer 222 may perform a nonlinear transform on the vector $y_j$ generated by the linear layer 221.

Specifically, according to an embodiment, the nonlinear layer 222 may convert the vector $y_j$ into an N-dimensional vector $z_j$ consisting of elements of the integer set $\mathbb{Z}_t$ by using a predefined nonlinear function $F: \mathbb{Z}_t \to \mathbb{Z}_t$ having an m-th order polynomial component (where m is a natural number m≥2), and output the vector $z_j$ (that is, $z_1 \in \mathbb{Z}_t^N$).

For example, when the vector $y_j$ is the same as Equation 14 described above, the nonlinear layer 222 may convert the vector $y_j$ into the vector z using Equation 15 below $$z_j = \{z_{j,1}, \ldots, z_{j,16}\} = \{F(y_{j,1}), \ldots, F(y_{j,16})\} \in \mathbb{Z}_t^{16}. \quad \text{(Equation 15)}$$

As a more specific example, when the nonlinear function F is a polynomial $F(x)=x^2$ having a quadratic (that is, m=2) polynomial component, the vector $z_j$ generated by the nonlinear layer 222 is as Equation 16 below $$z_j = \{z_{j,1}, \ldots, z_{j,16}\} = \{y_{j,1}^2, \ldots, y_{j,16}^2\} \in \mathbb{Z}_t^{16}. \quad \text{(Equation 16)}$$

Meanwhile, the addition layer 223 may generate the j+1-th round output vector $x_{j+1}$ by performing a modular addition operation on the vector $z_j$ generated by the nonlinear layer 222 and the j+1-th round key $RK_{j+1}$ of the z round keys with the prime number t as a modulus.

Specifically, the addition layer 223 may generate the j+1-th round output vector $x_{j+1}$ by using, for example, Equation 17 below $$x_{j+1} = z_j + RK_{j+1} \pmod{t} \in \mathbb{Z}_t^N. \quad \text{(Equation 17)}$$

Referring back to FIG. 2, the second round function 230 may generate the key stream by using an r−1-th round output vector $x_{r-1}$ generated by a first round function performed last among the one or more first round functions 220 and an r-th round key $RK_r$ of the r round keys.

Figure 4:
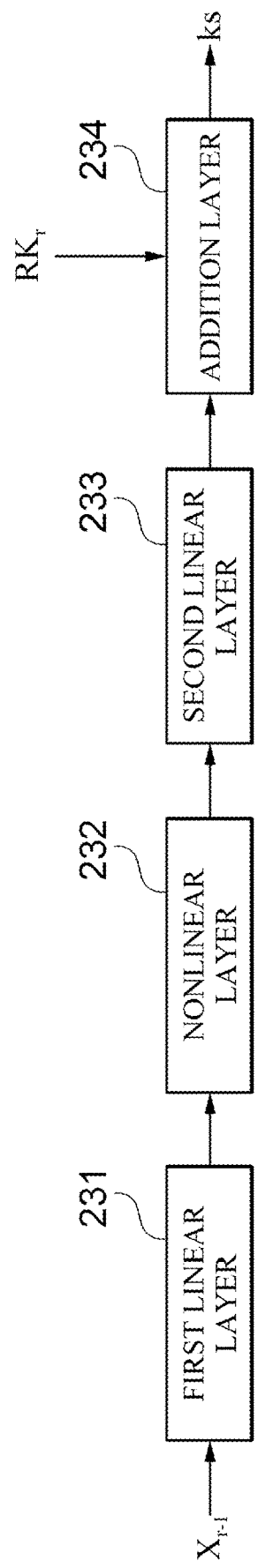
FIG. 4 is a diagram for illustrating a configuration of a second round function according to an embodiment.

Specifically, FIG. 4 is a diagram for illustrating the configuration of the second round function 230 according to an embodiment.

Referring to FIG. 4, the second round function 230 according to an embodiment may include a first linear layer 231, a nonlinear layer 232, a second linear layer 233, and an addition layer 234.

The first linear layer 231 may generate a vector $y_{r-1}$ that is an N-dimensional integer vector consisting of elements of the integer set $\mathbb{Z}_t$ by performing a linear transform on the r−1-th round output vector $x_{r-1}$ generated by the first round function performed last among the one or more first round functions 220.

According to an embodiment, the first linear layer 231 may perform a linear transform by using the first matrix A and the second matrix B.

Specifically, the first linear layer 231 may convert the r−1-th round output vector $x_{r-1}$ into the matrix $X_{r-1}$ of size n×n. For example, when the output vector $x_{r-1}$ is a 16-dimensional (that is, N=16) vector as shown in Equation 18 below, the first linear layer 231 may convert the r−1-th round output vector $x_{r-1}$ into the matrix $X_{r-1}$ of size 4×4, as shown in Equation 19 below, $$x_{r-1} = \{x_{r-1,1}, \ldots, x_{r-1,16}\} \in \mathbb{Z}_t^{16} \quad \text{(Equation 18)}$$

and $$X_{r-1} = \begin{bmatrix} x_{r-1,1} & \cdots & x_{r-1,4} \\ \vdots & \ddots & \vdots \\ x_{r-1,13} & \cdots & x_{r-1,16} \end{bmatrix} \in \mathbb{Z}_t^{4 \times 4}. \quad \text{(Equation 19)}$$

Then, the first linear layer 231 may generate a matrix $Y_{r-1}$ of size n×n by performing modular multiplication on the converted matrix $X_{r-1}$, the first matrix A, and the second matrix B with the prime number t as a modulus.

Specifically, the matrix $Y_{r-1}$ may be generated using, for example, Equation 20 below $$Y_{r-1} = A \cdot X_{r-1} \cdot B \pmod{t} \in \mathbb{Z}_t^{n \times n}. \quad \text{(Equation 20)}$$

Meanwhile, after generating the matrix $Y_{r-1}$, the first linear layer 231 may convert the matrix $Y_{r-1}$ into the N-dimensional vector $y_{jr-1}$, consisting of elements of the integer set $\mathbb{Z}_t$, and output the vector $y_{jr-1}$ (that is, $y_{r-1} \in \mathbb{Z}_t^N$).

For example, when N=16 and the matrix $Y_{r-1}$ is a matrix of size 4×4 as shown in Equation 21, the matrix $Y_{r-1}$ may be converted into the 16-dimensional vector $y_{r-1}$ as shown in Equation 22, $$Y_{r-1} = \begin{bmatrix} y_{r-1,1} & \cdots & y_{r-1,4} \\ \vdots & \ddots & \vdots \\ y_{r-1,13} & \cdots & y_{r-1,16} \end{bmatrix} \in \mathbb{Z}_t^{4 \times 4} \quad \text{(Equation 21)}$$

and $$y_{r-1} = \{y_{r-1,1}, \ldots, t_{r-1,16}\} \in \mathbb{Z}_t^{16}. \quad \text{(Equation 22)}$$

The nonlinear layer 232 may perform a nonlinear transform on the vector $y_{r-1}$ generated by the first linear layer 231. In this case, according to an embodiment, the nonlinear transform by the nonlinear layer 232 may be performed in the same manner as the nonlinear transform performed by the nonlinear layer 222 included in the first round function 220.

Specifically, according to an embodiment, the nonlinear layer 232 may convert the vector $y_{r-1}$ into an N-dimensional vector $z_{r-1}$ consisting of elements of the integer set $\mathbb{Z}_t$ by using a predefined nonlinear function $F: \mathbb{Z}_t \to \mathbb{Z}_t$ having an m-th order polynomial component of, and output the vector $z_{r-1}$ (that is, $z_j \in \mathbb{Z}_t^N$).

For example, when the vector $y_{r-1}$ is the same as Equation 22 described above, the nonlinear layer 232 may convert the vector $y_{r-1}$ into the vector $z_{r-1}$ using Equation 23 below $$z_{r-1} = \{z_{r-1,1}, \ldots, z_{r-1,16}\} = \{F(y_{r-1,1}), \ldots, F(y_{r-1,16})\} \in \mathbb{Z}_t^{16}. \quad \text{(Equation 23)}$$

Meanwhile, the second linear layer 233 performs the same operation as the first linear layer 231 except that the input vector is a vector generated by the nonlinear layer 232.

Specifically, the second linear layer 233 may convert the vector $z_{r-1}$ generated by the nonlinear layer 232 into a matrix $Z_{r-1}$ of size n×n. For example, when the vector $z_{r-1}$ generated by the nonlinear layer 232 is a 16 dimensional (that is, N=16) vector as in Equation 23 described above, the second linear layer 233 may convert the vector $z_{r-1}$ into the matrix $Z_{r-1}$ of size 4×4 as shown in Equation 24 below.

$$Z_{r-1} = \begin{bmatrix} Z_{r-1,1} & \cdots & Z_{r-1,4} \\ \vdots & \ddots & \vdots \\ Z_{r-1,13} & \cdots & Z_{r-1,16} \end{bmatrix} \in \mathbb{Z}_t^{4 \times 4} \quad \text{(Equation 24)}$$

Then, the second linear layer 233 may generate a matrix S of size n×n by performing modular multiplication on the converted matrix $Z_{r-1}$, the first matrix A, and the second matrix B with the prime number t as a modulus.

Specifically, the matrix S may be generated using, for example, Equation 25 below $$S = A \cdot Z_{r-1} \cdot B \pmod{t} \in \mathbb{Z}_t^{n \times n}. \quad \text{(Equation 25)}$$

Meanwhile, after generating the matrix S, the second linear layer 233 may convert the matrix S into an N-dimensional vectors consisting of elements of the integer set $\mathbb{Z}_t$, and output the vector s (that is, $s \in \mathbb{Z}_t^N$).

For example, when N=16 and the matrix S is a matrix of size 4×4 as shown in Equation 26, the matrix S may be converted into the 16-dimensional vector s as shown in Equation 27, $$S = \begin{bmatrix} s_1 & \cdots & s_4 \\ \vdots & \ddots & \vdots \\ s_{13} & \cdots & s_{16} \end{bmatrix} \in \mathbb{Z}_t^{4 \times 4} \quad \text{(Equation 26)}$$

and $$s = \{s_1, \ldots, s_{16}\} \in \mathbb{Z}_t^{16}. \quad \text{(Equation 27)}$$

Meanwhile, the addition layer 234 may generate a key stream ks by performing a modular addition operation on the vector s generated by the second linear layer 233 and the last (that is, the r-th) round key $RK_r$ of the z round keys with the prime number t as a modulus.

Specifically, the addition layer 234 may generate the key stream ks using, for example, Equation 28 below $$ks = s + RK_r \pmod{t} \in \mathbb{Z}_t^N. \quad \text{(Equation 28)}$$

Meanwhile, encryption using the key stream ks may be performed through a modular addition operation on a message M to be encrypted and the key stream ks with the prime number t as a modulus, as shown in Equation 29 below $$C = M - ks \pmod{t}. \quad \text{(Equation 29)}$$

In Equation 29, the message M to be encrypted may be an N-dimensional vector consisting of elements of an integer set $\mathbb{Z}_t$ (that is, $M \in \mathbb{Z}_t^N$).

In addition, the message M encrypted using the key stream ks may be decrypted by performing a modulo subtraction operation on a ciphertext C and the key stream ks with the prime number t as a modulus, as shown in Equation 30 below $$M = C - ks \pmod{t}. \quad \text{(Equation 30)}$$

Figure 5:
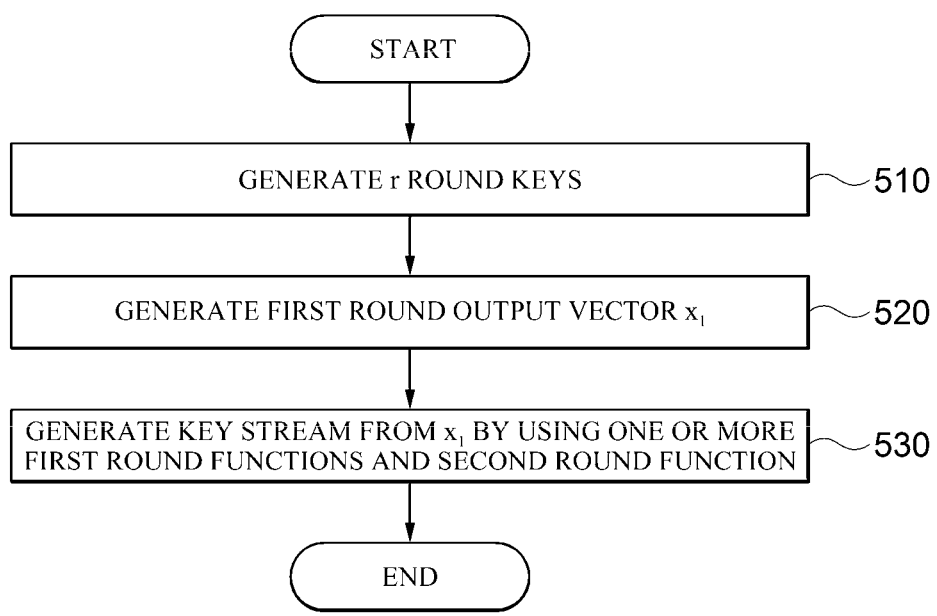
FIG. 5 is a flowchart of a method for generating a key stream according to an embodiment.

FIG. 5 is a flowchart of a method for generating a key stream according to an embodiment.

The method illustrated in FIG. 5 may be performed, for example, by the key stream generating apparatus 100 illustrated in FIG. 1.

Referring to FIG. 5, first, the key stream generating apparatus 100 generates r round keys based on the secret key k, the random bit string nc, and the encryption counter ctr (510).

Then, the key stream generating apparatus 100 generates a first round output vector $x_1$ by performing a modular addition operation on the first round key $RK_1$ of the r round keys and the initial vector with the prime number t as a modulus (520).

Then, the key stream generating apparatus 100 generates a key stream from the first round output vector $x_1$ by using the second to r-th round keys of the r round keys, one or more first round functions 220, and a second round function 230 (530).

Meanwhile, in the flowchart illustrated in FIG. 5, at least some of the steps may be performed in a different order, performed together in combination with other steps, omitted, performed in subdivided steps, or performed by adding one or more steps not illustrated.

Figure 6:
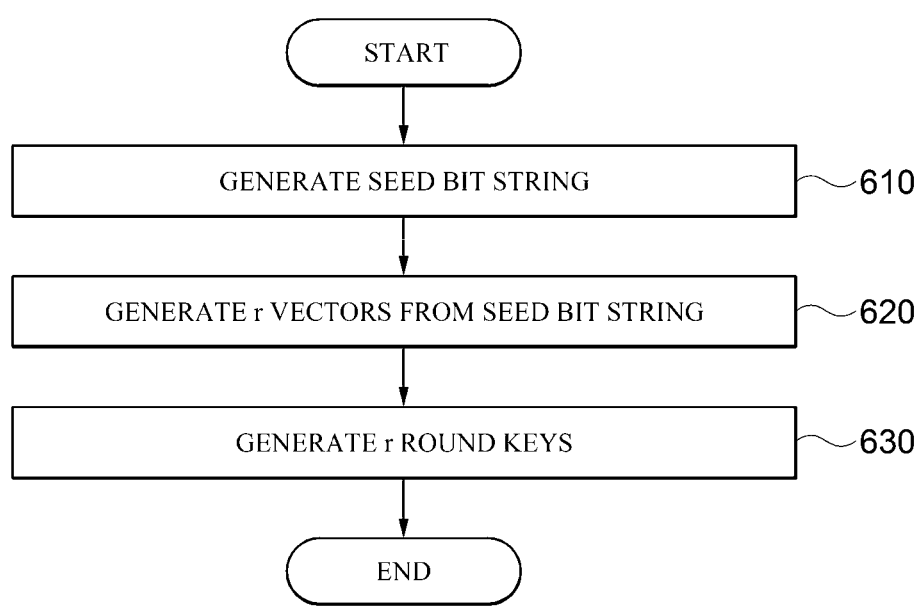
FIG. 6 is a flowchart showing a process of generating a round key according to an embodiment.

FIG. 6 is a flowchart showing a process of generating a round key according to an embodiment.

The process illustrated in FIG. 6 may be performed, for example, by the key stream generating apparatus 100 illustrated in FIG. 1.

Referring to FIG. 6, first, the key stream generating apparatus 100 generates a seed bit string based on the random bit string nc and the encryption counter ctr (610).

Then, the key stream generating apparatus 100 generates r vectors that are each N-dimensional integer vectors consisting of elements of the integer set $\mathbb{Z}_t$ from the seed bit string by using a predefined generation function (620).

Then, the key stream generating apparatus 100 generates r round keys by performing modular multiplication operation on each of the r vectors and the secret key k with the prime number t as a modulus (630).

Meanwhile, in the flowchart illustrated in FIG. 6, at least some of the steps may be performed in a different order, performed together in combination with other steps, omitted, performed in subdivided steps, or performed by adding one or more steps not illustrated.

Figure 7:
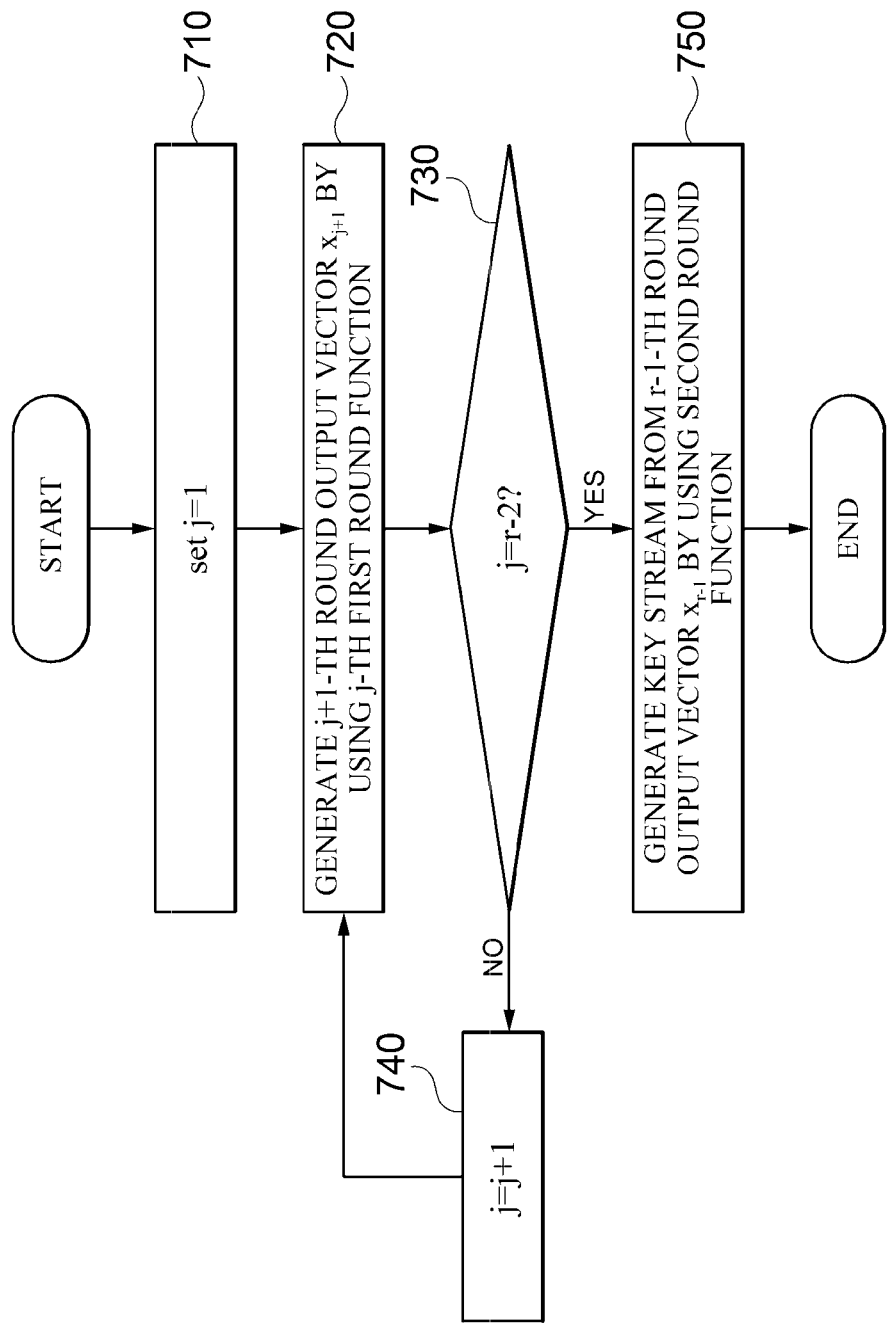
FIG. 7 is a flowchart showing a process of generating a key stream using one or more first round functions and a second round function according to an embodiment.

FIG. 7 is a flowchart showing a process of generating a key stream using one or more first round functions and a second round function according to an embodiment.

The method illustrated in FIG. 7 may be performed, for example, by the key stream generating apparatus 100 illustrated in FIG. 1.

Referring to FIG. 7, first, the key stream generating apparatus 100 sets an index value j, which indicates the number of times the first round function 220 is performed, to an initial value of 1 (710).

Then, the key stream generating apparatus 100 generates the j+1-th round output vector $x_{j+1}$ from the j-th round output vector $x_j$ by using the j-th first round function of one or more first round functions 220 (720).

Then, the key stream generating apparatus 100 determines whether j=r−2 (730).

At this time, when j≠r−2, the key stream generating apparatus 100 increases j by 1 (740) and then the process returns to step 720.

On the other hand, when j=r−2, the key stream generating apparatus 100 generates the key stream ks from the r−1-th round output vector $x_{r-1}$ generated by an r−2-th first round function of the one or more first round functions 220 by using the second round function 230 (750).

Meanwhile, in the flowchart illustrated in FIG. 7, at least some of the steps may be performed in a different order, performed together in combination with other steps, omitted, performed in subdivided steps, or performed by adding one or more steps not illustrated.

Figure 8:
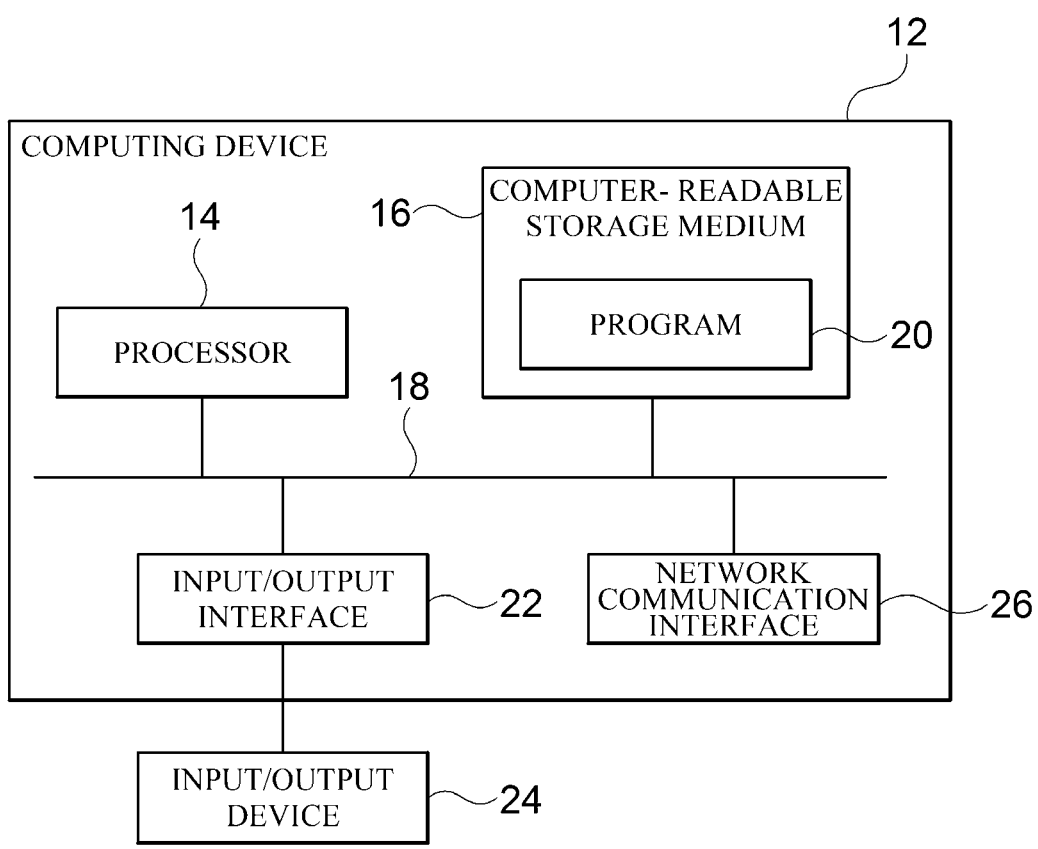
FIG. 8 is a block diagram for exemplarily illustrating a computing environment including a computing device according to an embodiment.

FIG. 8 is a block diagram for exemplarily illustrating a computing environment including a computing device according to an embodiment. In the illustrated embodiment, each component may have different functions and capabilities in addition to those described below, and additional components may be included in addition to those described below.

The illustrated computing environment 110 includes a computing device 12. In an embodiment, the computing device 12 may be one or more components included in the key stream data generating apparatus 100 illustrated in FIG. 1.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

According to the disclosed embodiments, it is possible to achieve highly efficient modular operation-based encryption without the need to apply an additional rebooting technique during homomorphic ciphertext conversion using the ciphertext conversion framework.

Although the present disclosure has been described in detail through the representative embodiments as above, those skilled in the art will understand that various modifications may be made thereto without departing from the scope of the present invention. Therefore, the scope of rights of the present disclosure should not be limited to the described embodiments, but should be defined not only by the claims set forth below but also by equivalents of the claims.

What is claimed is:

1. A processor-implemented method for generating a key stream, the method comprising:
   receiving a message;
   generating r round keys, where r is a natural number of r≥3, that are each N-dimensional integer vectors, where $N=n^2$, n is an integer of 2 or more, consisting of elements of an integer set $\mathbb{Z}_t$ defined based on a prime number t, based on a random bit string, an encryption counter, and a secret key that is an N-dimensional integer vector consisting of elements of the integer set $\mathbb{Z}_t$;
   generating a first round output vector $x_1$ by performing a modular addition operation on an initial vector and a first round key $RK_1$ of the r round keys with the prime number t as a modulus;
   generating a key stream that is an N-dimensional integer vector consisting of elements of the integer set $\mathbb{Z}_t$ from the first round output vector $x_1$ by using a second to r-th round keys of the r round keys, and one or more first round functions and a second round function;
   encrypting the message through the key stream and the prime number t as the modulus; and
   transmitting the encrypted message.

2. The method of claim 1, wherein the one or more first round functions are sequentially performed, and generate each a j+1-th round output vector $x_{j+1}$ by using a j-th round output vector $x_j$, where j is a natural number for 1≤j≤r−1, and a j+1-th round key $RK_{j+1}$ of the r round keys; and
   the second round function generates the key stream by using an r−1-th round output vector $x_{r-1}$ generated by a first round function performed last among the one or more first round functions and an r-th round key $RK_r$ of the r round keys.

3. The method of claim 2, wherein each of the one or more first round functions comprises:
   a linear layer for generating a vector $y_j$ that is an N-dimensional integer vector consisting of elements of the integer set $\mathbb{Z}_t$ by performing a linear transform on the j-th round output vector $x_j$;
   a nonlinear layer for generating a vector $z_j$ that is an N-dimensional integer vector consisting of elements of the integer set $\mathbb{Z}_t$ by performing a nonlinear transform on the vector $y_j$; and an addition layer for generating the j+1-th round output vector $x_{j+1}$ by performing a modular addition operation on the vector $z_j$ and the j+1-th round key $RK_{j+1}$ with the prime number t as a modulus.

4. The method of claim 3, wherein the linear layer performs the linear transform by using a predefined first matrix of size n×n consisting of elements of the integer set $\mathbb{Z}_t$ and a second matrix that is a transposed matrix of the first matrix.

5. The method of claim 4, wherein the linear layer converts the j-th round output vector $x_j$ into a matrix $X_j$ of size n×n, generates a matrix $Y_j$ of size n×n by performing modular multiplication on the matrix $X_j$, the first matrix, and the second matrix with the prime number t as a modulus, and converts the matrix $Y_j$ into the vector $y_j$.

6. The method of claim 5, wherein the linear layer generates the matrix $Y_j$ using Equation 1:

$$Y_j = A \cdot X_j \cdot B (\bmod\ t) \in \mathbb{Z}_t^{n \times n} \quad \text{[Equation 1]}$$

where A is the first matrix and B is the second matrix.

7. The method of claim 3, wherein the nonlinear layer performs the nonlinear transform by using a nonlinear function having an m-th-order polynomial component, where m is a natural number for m≤2.

8. The method of claim 2, wherein the second round function comprises:

a first linear layer for generating a vector $y_{r-1}$ that is an N-dimensional integer vector consisting of elements of the integer set $\mathbb{Z}_t$ by performing a linear transform on the r−1-th round output vector $x_{r-1}$;

a nonlinear layer for generating a vector $z_{r-1}$ that is an N-dimensional integer vector consisting of elements of the integer set $\mathbb{Z}_t$ by performing a nonlinear transform on the vector $y_{r-1}$;

a second linear layer for generating a vector s that is an N-dimensional integer vector consisting of elements of the integer set $\mathbb{Z}_t$ by performing a linear transform on the vector $z_{r-1}$; and an addition layer for generating the key stream by performing a modular addition operation on the vector s and the r-th round key $RK_r$ with the prime number t as a modulus.

9. The method of claim 8, wherein each of the first linear layer and the second linear layer performs the linear transform by using a predefined first matrix of size n×n consisting of elements of the integer set $\mathbb{Z}_t$ and a second matrix that is a transposed matrix of the first matrix.

10. The method of claim 9, wherein the first linear layer converts the r−1-th round output vector $x_{r-1}$ into a matrix $X_{r-1}$ of size n×n, generates a matrix $Y_{r-1}$ of size n×n by performing modular multiplication on the matrix $X_{r-1}$, the first matrix, and the second matrix with the prime number t as a modulus, and converts the matrix $Y_{r-1}$ into the vector $y_{r-1}$; and the second linear layer converts the vector $z_{r-1}$ into a matrix $Z_{r-1}$ of size n×n, generates a matrix S of size n×n by performing modular multiplication on the matrix $Z_{r-1}$, the first matrix, and the second matrix with the prime number t as a modulus, and converts the matrix S into the vector s.

11. The method of claim 10, wherein the first linear layer generates the matrix $Y_{r-1}$ using Equation 2:

$$Y_{r-1} = A \cdot X_{r-1} \cdot B (\bmod\ t) \in \mathbb{Z}_t^{n \times n} \quad \text{[Equation 2]}$$

where A is the first matrix and B is the second matrix; and the second linear layer generates the matrix S using Equation 3:

$$S = A \cdot Z_{r-1} \cdot B (\bmod\ t) \in \mathbb{Z}_t^{n \times n} \quad \text{[Equation 3]}$$

where A is the first matrix and B is the second matrix.

12. The method of claim 8, wherein the nonlinear layer performs a nonlinear transform by using a nonlinear function having an m-th-order polynomial component, where m is a natural number for m≥2.

13. The method of claim 1, wherein the generating of the round key comprises:

generating a seed bit string based on the random bit string and the encryption counter;

generating r vectors that are each N-dimensional integer vectors consisting of elements of the integer set $\mathbb{Z}_t$ from the seed bit string by using a predefined generation function; and generating the r round keys by performing modular multiplication operation on each of the r vectors and the secret key with the prime number t as a modulus.

14. The method of claim 13, wherein the generating of the r round keys comprises generating the r round keys using Equation 4:

$$RK_i = k 2 0 rc_i (\bmod\ t) \quad \text{[Equation 4]}$$

where $RK_i$ is an i-th round key of the r round keys, k is the secret key, $rc_i$ is an i-th vector of the r vectors, i is a natural number for 1≤1≤r, and ○ is an elementwise product between two vectors.

15. An apparatus for generating a key stream, the apparatus comprising:

one or more processors configured to execute instructions; and a memory storing the instructions, wherein the execution of the instructions by the one or more processors configures the one or more processors to:

receive a message;

generate r round keys (where r is a natural number of r≥3) that are each N-dimensional integer vectors (where $N=n^2$, n is an integer of 2 or more) consisting of elements of an integer set $\mathbb{Z}_t$ defined based on a prime number t, based on a random bit string, an encryption counter, and a secret key that is an N-dimensional integer vector consisting of elements of the integer set $\mathbb{Z}_t$;

generate a first round output vector $x_1$ by performing a modular addition operation on an initial vector and a first round key $RK_1$ of the r round keys with the prime number t as a modulus;

generate a key stream that is an N-dimensional integer vector consisting of elements of the integer set $\mathbb{Z}_t$, from the first round output vector $x_1$ by using a second to r-th round keys of the r round keys, and one or more first round functions and a second round function;

encrypt the message through the key stream and the prime number t as the modulus; and transmit the encrypted message.

16. The apparatus of claim 15, wherein the one or more first round functions are sequentially performed, and generate each a j+1-th round output vector $x_{j+1}$ by using a j-th round output vector $x_j$, where j is a natural number for $1 \leq 1 \leq r-1$, and a j+1-th round key $RK_{j+1}$ of the r round keys; and the second round function generates the key stream by using an r−1-th round output vector $x_{r-1}$ generated by a first round function performed last among the one or more first round functions and an r-th round key $RK_r$ of the r round keys.

17. The apparatus of claim 16, wherein each of the one or more first round functions comprises:

a linear layer for generating a vector $y_j$ that is an N-dimensional integer vector consisting of elements of the integer set $\mathbb{Z}_t$ by performing a linear transform on the j-th round output vector $x_j$;

a nonlinear layer for generating a vector $z_j$ that is an N-dimensional integer vector consisting of elements of the integer set $\mathbb{Z}_t$ by performing a nonlinear transform on the vector $y_j$; and an addition layer for generating the j+1-th round output vector $x_{j+1}$ by performing a modular addition operation on the vector $z_j$ and the j+1-th round key $RK_{j+1}$ with the prime number t as a modulus.

18. The apparatus of claim 17, wherein the linear layer performs the linear transform by using a predefined first matrix of size n×n consisting of elements of the integer set $\mathbb{Z}_t$ and a second matrix that is a transposed matrix of the first matrix.

19. The apparatus of claim 18, wherein the linear layer converts the j-th round output vector $x_j$ into a matrix $X_j$ of size n×n, generates a matrix $Y_j$ of size n×n by performing modular multiplication on the matrix $X_j$, the first matrix, and the second matrix with the prime number t as a modulus, and converts the matrix $Y_j$ into the vector $y_j$.

20. The apparatus of claim 19, wherein the linear layer generates the matrix $Y_j$ using Equation 1:

$$Y_j = A \cdot X_j \cdot B (\text{mod } t) \in \mathbb{Z}_t^{n \times n} \qquad \text{[Equation 1]}$$

where A is the first matrix and B is the second matrix.

21. The apparatus of claim 17, wherein the nonlinear layer performs the nonlinear transform by using a nonlinear function having an m-th-order polynomial component, where m is a natural number for m≥2.

22. The apparatus of claim 16, wherein the second round function comprises:

a first linear layer for generating a vector $y_{r-1}$ that is an N-dimensional integer vector consisting of elements of the integer set $\mathbb{Z}_t$ by performing a linear transform on the r−1-th round output vector $x_{r-1}$;

a nonlinear layer for generating a vector $z_{r-1}$ that is an N-dimensional integer vector consisting of elements of the integer set $\mathbb{Z}_t$ by performing a nonlinear transform on the vector $y_{r-1}$;

a second linear layer for generating a vector s that is an N-dimensional integer vector consisting of elements of the integer set $\mathbb{Z}_t$ by performing a linear transform on the vector $z_{r-1}$; and an addition layer for generating the key stream by performing a modular addition operation on the vector s and the r-th round key $RK_r$ with the prime number t as a modulus.

23. The apparatus of claim 22, wherein each of the first linear layer and the second linear layer performs the linear transform by using a predefined first matrix of size n×n consisting of elements of the integer set $\mathbb{Z}_t$ and a second matrix that is a transposed matrix of the first matrix.

24. The apparatus of claim 23, wherein the first linear layer converts the r−1-th round output vector $x_{r-1}$ into a matrix $X_{r-1}$ of size n×n, generates a matrix $Y_{r-1}$ of size n×n by performing modular multiplication on the matrix $X_{r-1}$, the first matrix, and the second matrix with the prime number t as a modulus, and converts the matrix $Y_{r-1}$ into the vector $y_{r-1}$; and the second linear layer converts the vector $z_{r-1}$ into a matrix $Z_{r-1}$ of size n×n, generates a matrix S of size n×n by performing modular multiplication on the matrix $Z_{r-1}$, the first matrix, and the second matrix with the prime number t as a modulus, and converts the matrix S into the vector s.

25. The apparatus of claim 24, wherein the first linear layer generates the matrix $Y_{r-1}$ using Equation 2:

$$Y_{r-1} = A \cdot X_{r-1} \cdot B (\text{mod } t) \in \mathbb{Z}_t^{n \times n} \qquad \text{[Equation 2]}$$

where A is the first matrix and B is the second matrix; and the second linear layer generates the matrix S using Equation 3:

$$S = A \cdot Z_{r-1} \cdot B (\text{mod } t) \in \mathbb{Z}_t^{n \times n} \qquad \text{[Equation 3]}$$

where A is the first matrix and B is the second matrix.

26. The apparatus of claim 22, wherein the nonlinear layer performs the nonlinear transform by using a nonlinear function having an m-th-order polynomial component (where m is a natural number for m≥2).

27. The apparatus of claim 15, wherein the one or more processors are further configured to:

generate a seed bit string based on the random bit string and the encryption counter;

generate r vectors that are each N-dimensional integer vectors consisting of elements of the integer set $\mathbb{Z}_t$ from the seed bit string by using a predefined generation function; and generate the r round keys by performing modular multiplication operation on each of the r vectors and the secret key with the prime number t as a modulus.

28. The apparatus of claim 27, wherein the one or more processors are further configured to generate the r round keys using Equation 4:

$$RK_i = k \circ rc_i (\text{mod } t) \qquad \text{[Equation 4]}$$

where $RK_i$ is an i-th round key of the r round keys, k is the secret key, $rc_i$ is an i-th vector of the r vectors, i is a natural number for $1 \leq 1 \leq r$, and ∘ is an elementwise product between the two vectors.

* * * * *